J. G. WOLVIN.
VENTILATING VAULT AND PLATFORM LIGHT.
No. 17,613. Patented June 16, 1857.
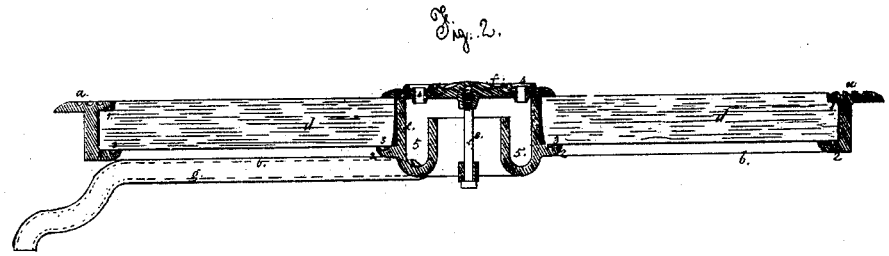
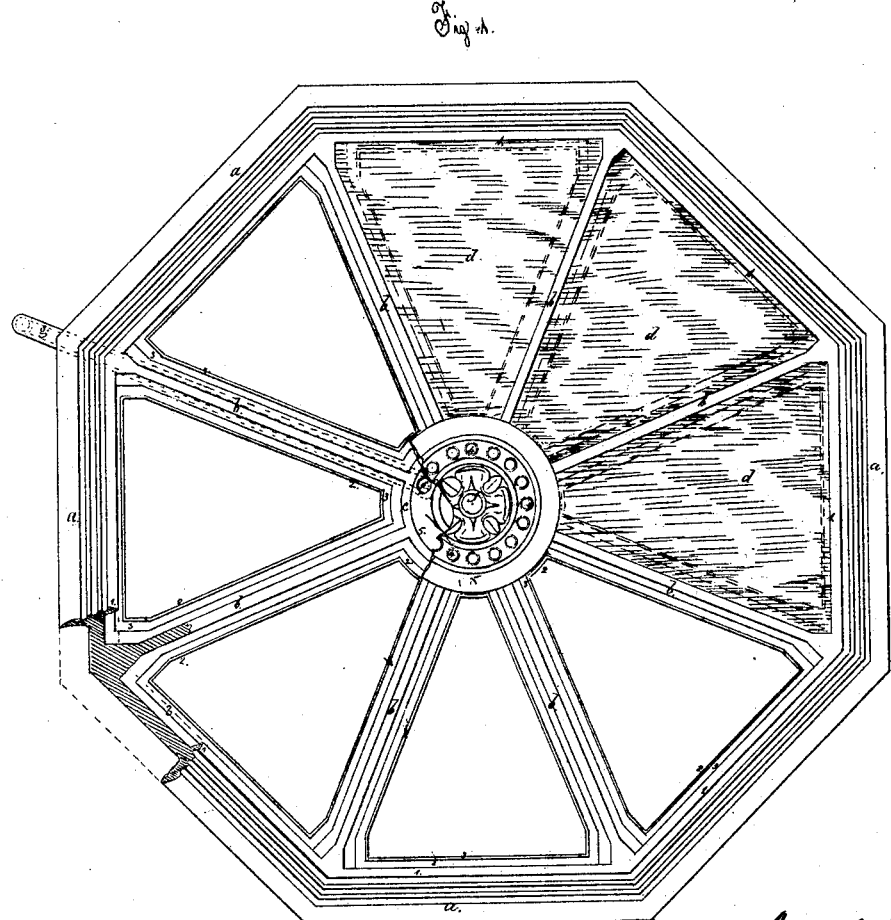

UNITED STATES PATENT OFFICE.

JOHN G. WOLVIN, OF NEW YORK, N. Y., ASSIGNOR TO HIMSELF AND GEORGE PECKHAM.

VENTILATING VAULT AND PLATFORM LIGHT.

Specification of Letters Patent No. 17,613, dated June 16, 1857.

*To all whom it may concern:*

Be it known that I, JOHN G. WOLVIN, of the city, county, and State of New York, have invented and made certain new and useful Improvements in Ventilating Vault and Platform Lights; and I do hereby declare that the following is a full, clear, and exact description of the construction and operation of the same, reference being had to the annexed drawing, making part of this specification, wherein—

Figure 1, is a plan of a vault cover as fitted with my improvements showing the glass removed from five of the sections, to represent the other parts, and Fig. 2 is a vertical section of said vault light.

Similar marks of reference denote corresponding parts.

In the construction of vault and platform lights considerable difficulty has heretofore been experienced in securing the glass in such a manner that a reliable tight joint could be formed, and one that would not leak in consequence of the transit of passengers or articles over the same, or from the vault light being removed and carelessly thrown wrong side up. For these reasons vault and platform lights with but small pieces of glass set in metal frames have almost universally been used; and the difference in the expansion and contraction of metal frames and glass has heretofore been a difficulty in the way of using large sized pieces of glass in vault covers, because the cement or glass were apt to crack and the light become leaky, and the cement if sufficiently elastic would generally ooze out by use, below the glass, between said glass and its bearing.

The nature of my said invention consists in providing a rabbet at one end of the glass, that sets under a rib on the metallic frame, in combination with a clamping plate, setting over the other end of the glass in such a manner that the glass can not escape, or become loose; also in constructing the flanges of the frame on which the glass rests with a groove to retain an india rubber elastic cord, cement, or equivalent material, onto which the glass is pressed by the aforesaid means, so as to form a perfectly tight joint, and also my said invention relates to forming the clamping plate aforesaid with perforations combined with a receptacle formed in the junction of the metallic frames connected to an escape pipe in such a manner that ventilation will be provided, but the leakage passing through the ventilating holes will be taken away.

In the drawing a sexagonal vault light is shown but the same might be of any other polygonal shape, or might represent one section of a platform in which square glasses are used or the mass made up of hexagonal sections.

$a$, is the metallic frame surrounding the vault light.

$b$, $b$, are the radial branches uniting in the center $c$.

$d$, $d$, are the glass sections formed with a rabbet to set beneath the rib 1, of the part $a$, of the frame.

2, is the flange surrounding the lower part of the openings into which the glasses set. This flange 2, is made with a groove at 3, into which a cord of india rubber or equivalent elastic material or cement is placed; the sections of glass are then slid into place by inserting the end beneath the rib 1, then pressing the glass down into place on said elastic material. The cap or clamping plate $f$ is then put in place over the center $c$, and securely compressed onto the angles of the glass sections by means of a bolt $e$, passing through a bridge across the center part $c$, of the frame. The openings between the glasses and frames are then packed with suitable cement that will aid in keeping the joint watertight. I prefer that this cement be of a resinous nature and melted into the joint.

The clamping plate $f$ is formed with holes 4, 4, surrounding the same, and being immediately above a ring shaped gutter 5, in the center opening $c$, of the frame, so that ventilating space is provided, and all water passing through the holes 4, is caught and taken away by a pipe $g$ from the ring-shaped gutter 5.

I do not claim ventilating holes and a gutter for vault lights in itself as these have before been used, but

What I claim and desire to secure by Letters Patent is—

1. The manner herein specified of securing the glass sections in place by the combined operation of the rabbet 1, and clamping plate $f$, as specified.

2. I also claim the groove 3, in the flange 2, on which the glass rests to retain a cord of india rubber or other elastic material, or cement, and make a tight joint with the glass as specified.

3. I also claim the gutter 5, formed at the center c, of the radial bars b, in combination with the perforated clamping plate f and pipe g, as specified.

In witness whereof I have hereunto set my signature this eighteenth day of May 1857.

JOHN G. WOLVIN.

Witnesses:
LEMUEL W. SERRELL,
THOMAS G. HAROLD.